Nov. 14, 1967  T. G. HART  3,352,162

MEANS FOR AND METHOD OF DETECTING ROTATION

Filed Oct. 29, 1958  8 Sheets-Sheet 1

THOMAS G. HART
INVENTOR

BY
ATTORNEYS

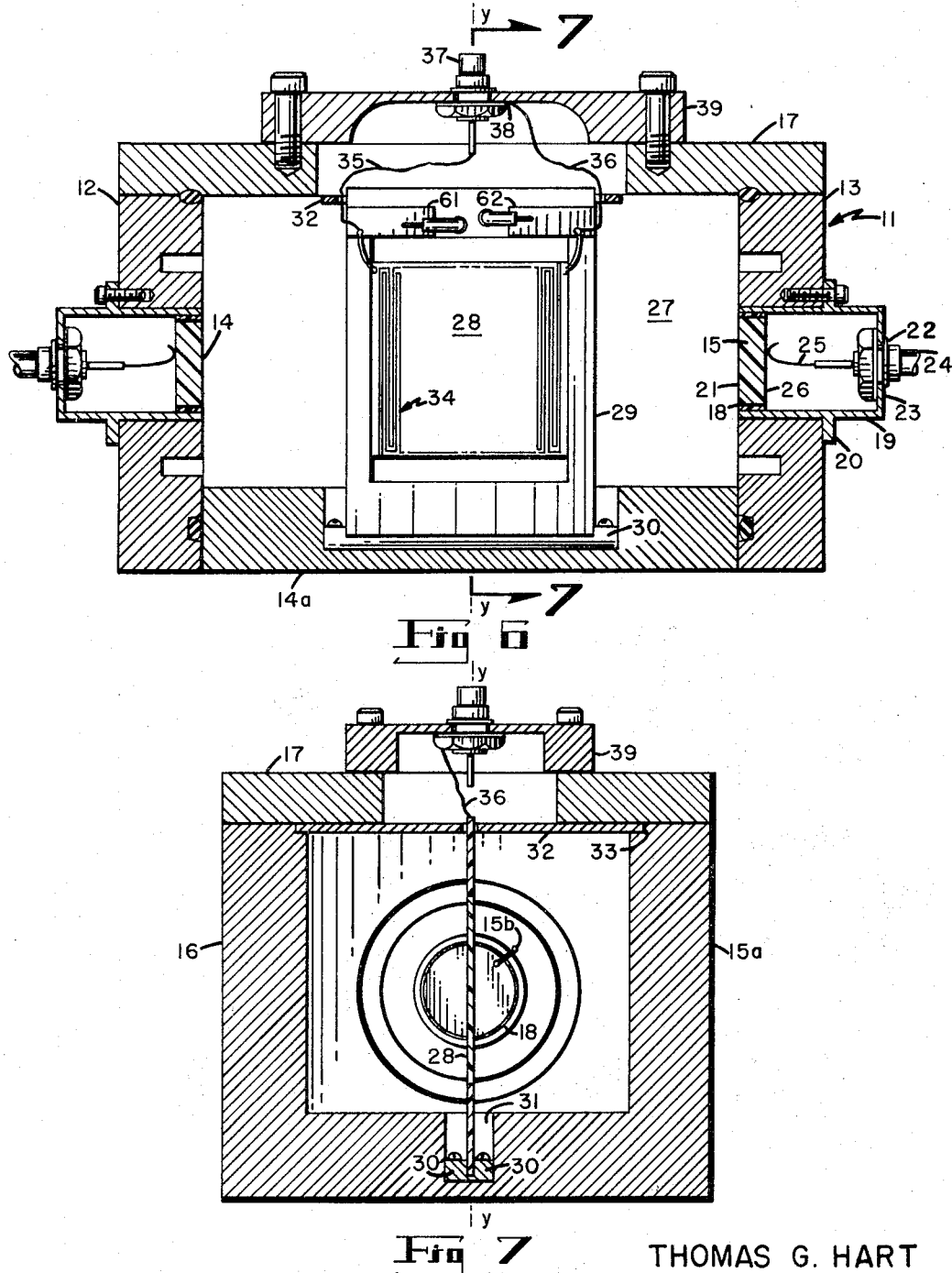

Nov. 14, 1967  T. G. HART  3,352,162
MEANS FOR AND METHOD OF DETECTING ROTATION
Filed Oct. 29, 1958  8 Sheets-Sheet 3

THOMAS G. HART
INVENTOR

BY
ATTORNEYS

THOMAS G. HART
INVENTOR

THOMAS G. HART
INVENTOR

Nov. 14, 1967     T. G. HART     3,352,162
MEANS FOR AND METHOD OF DETECTING ROTATION
Filed Oct. 29, 1958     8 Sheets-Sheet 7

THOMAS G. HART
INVENTOR

BY *Alden D. Redfield*
*Warren Kunz*
ATTORNEYS

Nov. 14, 1967     T. G. HART     3,352,162

MEANS FOR AND METHOD OF DETECTING ROTATION

Filed Oct. 29, 1958     8 Sheets-Sheet 8

THOMAS G. HART
INVENTOR

BY Alden D. Redfield
Warren Kunz
ATTORNEYS

United States Patent Office 3,352,162
Patented Nov. 14, 1967

3,352,162
MEANS FOR AND METHOD OF DETECTING ROTATION
Thomas G. Hart, West Acton, Mass., assignor to Avco Manufacturing Corporation, Cincinnati, Ohio, a corporation of Delaware
Filed Oct. 29, 1958, Ser. No. 770,507
22 Claims. (Cl. 73—505)

The present invention relates to the field of instrumentation and more particularly to that portion of the field which concerns sensors such as may be used for detecting rotation of a body.

Instruments made in accordance with the present invention may employ ultrasonic phenomena for producing standing acoustic waves which, upon rotation, yield Coriolis forces proportional to the rate of rotation. The Coriolis forces, being normal to the direction of the standing waves, may be readily detected as an indication and measure of rotation.

Generally, these novel instruments include a medium in which a standing acoustic wave is established. In the preferred embodiment of the invention, the medium comprises a liquid in intimate association with a pair of opposed piezoelectric transducers which are electronically driven to establish the standing wave within the medium. Submerged within the medium is a third transducer which serves as detector. This detector transducer is oriented generally parallel to the standing wave and generates an electrical signal proportional to its flexural deflection caused by Coriolis forces acting at 90° to the standing wave.

Modified versions of the invention may utilize only one transducer and an opposed reflector for establishing the standing wave within the medium. In another version of the invention, the liquid medium is replaced by a solid.

Sensors made in accordance with the teaching of this invention may be conveniently built in either rectangular or cylindrical form. In rectangular form the driving transducers for producing the standing wave are planar and parallel, whereas in the cylindrical sensor the driving transducers may take the form of concentric cylinders.

Useful in many fields where rotation is to be measured, the sensor of this invention is characterized by simplicity and absence of moving parts. It may eventually replace gyroscopic elements in many applications where rate gyros are presently employed, as in guidance systems for missiles.

In view of the forgeoing it will be apparent that it is a broad object of the invention to provide an improved means for and method of detecting rotation of a body.

Another broad object of the invention is to provide an ultrasonic instrument employing Coriolis forces for detecting the rate of rotation to which the instrument is subjected.

Another important object of the invention is to provide a method of orienting and energizing driving and detector transducers whereby a standing wave is established for creating, upon rotation, Coriolis forces which may be detected by the detector transducer as a measure of rotation.

Other specific objects are as follows:

(a) Provision of a rectangular sensor having at least one planar transducer for establishing standing acoustic waves within the sensor.

(b) Provision of a novel form of solid sensor within which standing acoustic waves may be established for producing Coriolis forces when the sensor is rotated.

(c) Provision of an improved form of detector transducer for use in ultrasonic instruments.

The novel features that are considered characteristic of the invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 6 is a longitudinal sectional view through a rectangular sensor having a pair of driving transducers;

FIGURE 7 is a cross sectional view taken on plane 7—7 of FIGURE 6;

*General principles*

Figure 1:
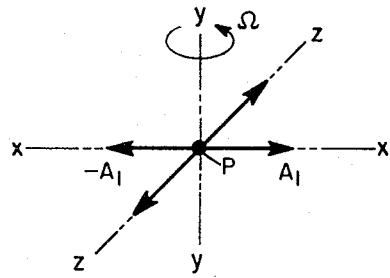
FIGURE 1 is a diagrammatic representation of the effect of rotation on a particle executing harmonic motion.
Figure 2:
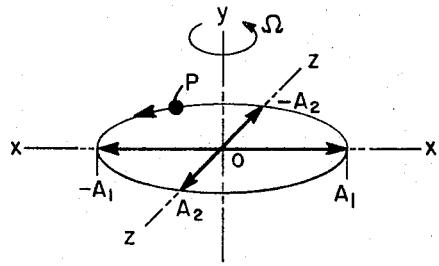
FIGURE 2 is a diagrammatic representation of the moving particle describing a curved path under the influence of harmonic and Coriolis forces.
Figure 3:
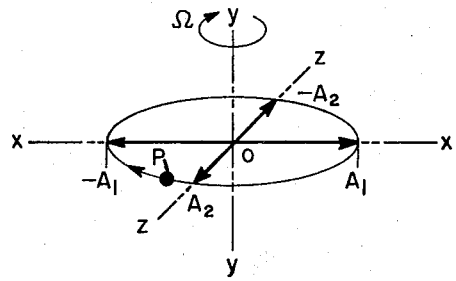
FIGURE 3 is a diagram of particle movement similar to FIGURE 2 but opposite in direction.

Principles underlying this invention will be understood by reference to FIGURES 1-3. Referring first to FIGURE 1, a particle P having mass is shown executing simple harmonic motion along the horizontal axis $x$—$x$. If the path of such a particle is rotated about an axis $y$—$y$ normal to its line of oscillation, it will begin to oscillate at the same frequency at right angles to the original oscillation along the axis $z$—$z$, which throughout this discussion is assumed to remain mutually perpendicular to $x$—$x$ and $y$—$y$ as rotation occurs. The amplitude of the second oscillation will be proportional to the amplitude of the first oscillation, to the rate of rotation $\Omega$ and inversely to the frequency of oscillation of the harmonic motion $\omega$. Thus, in FIGURE 1, $A_1$ may be taken to represent the maximum amplitude of the particle along the $x$—$x$ axis, the amplitude $x$ at any time $t$ being $x=A_1 \sin \omega t$. As will be discussed more fully hereinafter, the amplitude of oscillation along the $z$—$z$ axis will therefore be proportional to $A_1$, $\Omega$, and $1/\omega$.

It remains to be pointed out that the direction of rotation of the system about the $y$—$y$ axis determines the phase relationship between the harmonic oscillations along the $x$—$x$ and $z$—$z$ axes. This will be better understood with reference to FIGURES 2 and 3.

In FIGURE 2, the particle is assumed to be initially oscillating harmonically along the $x$—$x$ axis, describing a path between the extreme amplitudes $-A_1$ and $+A_1$. If the $x$—$x$ axis is now rotated about axis $y$—$y$, counterclockwise as viewed from above, the particle is displaced in the $z$—$z$ direction. The sense of this displacement, relative to that in the $x$—$x$ direction, is directly related to the direction of rotation of the system. Thus, as the particle moves from the extreme position $A_1$, to the opposite extreme $-A_1$, the displacement of the particle in the $z$—$z$ direction increases from zero to $-A_2$ and then back to zero. As the particle moves from $-A_1$ to $A_1$, the particle is displaced in the $z$—$z$ direction from zero to $A_2$ and then back to zero. In other words, while the entire system is being rotated about $y$—$y$, the particle describes an elliptical orbit having a semimajor axis of $A_1$ and a semiminor axis of $A_2$. As a special case, when $A_1=A_2$, the orbit is circular.

The direction of movement of the particle in the elliptical orbit is reversed if the direction of rotation of the system is reversed. This is illustrated by FIGURE 3 in which the system is shown rotated clockwise about the $y$—$y$ axis as viewed from above. With such rotation, the particle is displaced in the $z$—$z$ direction from zero to $A_2$ and back to zero as the displacement in the $x$—$x$ direction varies from $A_1$ to $-A_1$. Thus, a 180° shift is effected in the phase of the particle displacement with respect to the $x$—$x$ and $z$—$z$ axes by reversal in direction of rotation of the system. The reason for the phenomenon will become more apparent when the nature of Coriolis forces is considered in greater detail later in the application.

It is sufficient at this point to understand that rotation of the system produces particle displacement in a direction 90° from the direction of the original harmonic oscillation and that the phase is related to the direction of rotation of the system.

Coriolis forces

Coriolis forces are present when the path along which a particle is moving is subjected to rotation. Thus, if a particle moves on a path as the path rotates, the acceleration of the particle is the vector sum of (1) the acceleration that the particle would have if the path were fixed and the particle moved along the path with velocity $v$, (2) the acceleration that the particle would have if it were fixed on the path and the path rotated with angular velocity $\Omega$, and (3) $2v\Omega$, called the "component supplementary acceleration." It is this latter quantity, which in common parlance is termed the "Coriolis acceleration." It is directed perpendicular to $v$ with a sense such that if it were applied as a force at the end of the vector $v$, it would cause the vector $v$ to turn in its actual direction of rotation.

Returning to FIGURES 1–3, it will now be understood that the Coriolis acceleration itself is directly dependent upon, not only the velocity of the particle along the $x$—$x$ axis, but also the rate of angular rotation of the system $\Omega$. The velocity $v$ of the harmonic oscillation, in turn is proportional to the first derivative of the harmonic expression $A_1 \sin \omega t$.

Thus, if the displacement in the $x$—$x$ direction is expressed $x=A_1 \sin \omega t$, the velocity in the $x$—$x$ direction will be:

$$\frac{dx}{dt} = v = A_1 \omega \cos \omega t$$

Assuming that counterclockwise rotation of the system is considered positive, the Coriolis acceleration is equal to:

$$2v\Omega = 2A_1 \Omega \omega \cos \omega t$$

and if clockwise rotation of the system is deemed negative, then the Coriolis acceleration becomes:

$$-2A_1 \Omega \omega \cos \omega t$$

The Coriolis acceleration therefore changes from positive to negative if the direction of the rotation of the system is reversed, despite the fact that the harmonic velocity $v$ does not change sign. This bears out the foregoing statements that a phase shift is introduced between the Coriolis acceleration and the harmonic velocity as the rotation of the system is reversed and, in fact, it will be noted from the foregoing equations that the phase shift is equal to 180°.

The sensors disclosed in this application are designed to detect the forces resulting from the Coriolis acceleration and further, by detecting the phase relationship of the Coriolis acceleration relative to the harmonic velocity, an indication of the direction, as well as magnitude, of rotation of the system may be obtained.

It will be apparent to those skilled in the art that a rotation rate sensor will also serve as a displacement sensor since displacement is merely the time integral of rate. Similarly, with certain restrictions, a rate sensor may also be employed as an acceleration sensor since acceleration is merely the time differential of rate. Since the use of the device as a displacement or acceleration sensor is mainly a function of the system use of the device and not the device itself, elaboration of these particulars is not necessary.

A more complete discussion of Coriolis accelerations will be found in most textbooks on mechanics. One such text having an excellent discussion of the effect, is "Analytical Mechanics for Engineers," by F. B. Seely and N. E. Ensign, second edition, published by John Wiley & Sons, Inc.

Acoustic wave phenomena

To this point in our discussion we have predicated Coriolis accelerations on the motion of a discrete particle having mass. The same principles may be applied to a fluid or solid medium, which may be regarded as a collection of particles. By establishing an acoustic wave in the medium, as by application of energy at ultrasonic frequency, the particles may be set in motion and when rotated, will generate Coriolis forces. A simple explanation of such techniques will be understood with reference to FIGURES 4 and 5.

Figure 4:
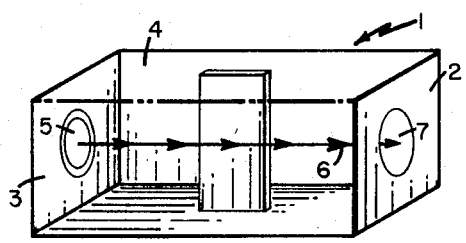
FIGURE 4 is a simplified perspective view of a rectangular sensor.

FIGURE 4 shows diagrammatically a housing, generally designated 1, having parallel end walls 2 and 3. Within the housing is a liquid 4 to which energy is delivered by a driving transducer 5. The transducer may take the form of a piezoelectric crystal which is electrically excited. As is well known, such crystals are capable of efficiently converting electrical energy into mechanical vibrations when excited at their natural frequency. If such a vibrating transducer is immersed in a liquid, it will cause a plane acoustic wave to travel through the liquid, as indicated by the plurality of arrows 6.

If a single driving transducer were immersed in an infinite medium, a plane acoustic wave could be set up in the medium and it could be used to establish Coriolis forces for measuring rotation. This, however, is a theoretical proposition, and in practice, it is not desirable to build a sensor having effectively an infinite medium. Since the medium must necessarily be bounded, as by housing 1, it is desirable to provide either a reflecting surface or another driving transducer 7 opposite transducer 5. As will be explained more fully hereinafter, both can be used to establish a standing acoustic wave within the sensor, and the energy stored in the standing wave can be made very large compared with the rate at which energy is imparted to the system by the transducer 5.

Two harmonic waves travelling in opposite directions will establish a standing wave in a stationary medium if these waves have the same frequency, have the same velocity of propagation within the medium, and are properly phased to reinforce each other. These conditions can be met in a sensor, such as shown in FIGURE 4, since the velocity of propagation is a function of the medium common to both driven waves (or the driven and reflected waves, as the case may be), and because no change of frequency is effected by the reflector or by the second driving transducer, positioned at 7. Proper phasing can be attained by establishing the proper distance between the driving transducers, or the driving transducer and reflector, or alternatively by choosing an appropriate frequency.

Figure 5:
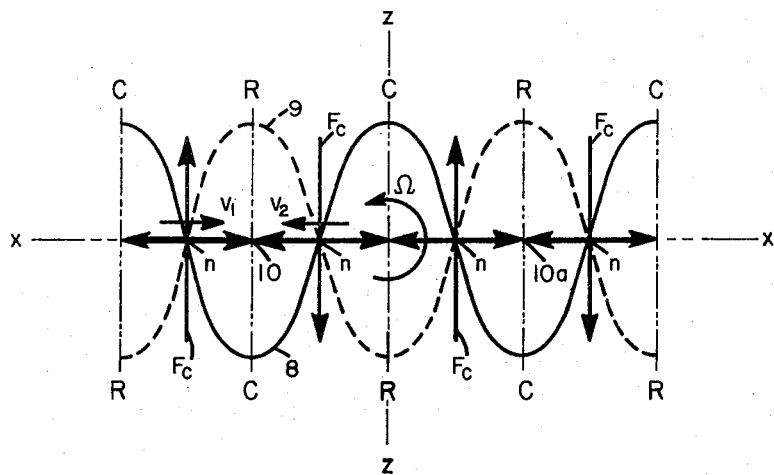
FIGURE 5 is a diagrammatic representation of a standing acoustic wave and associated Coriolis forces acting normal to the wave.
Figure 8:
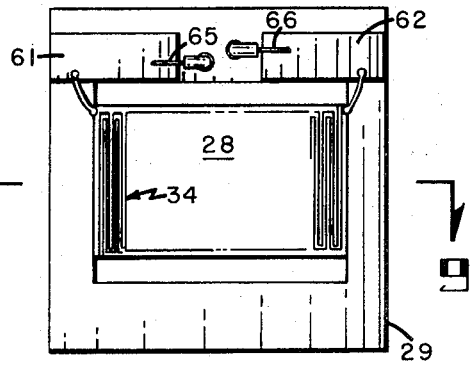
FIGURE 8 is a front elevational view of a special detector transducer that may be used in a rotation sensor.

FIGURE 5 will promote an understanding of standing waves. The figure has been drawn in the plane of $x$—$x$, $z$—$z$ axes, with the $y$—$y$ axis perpendicular to the plane of the paper at the intersection of the other axes. It will be assumed that a pair of transducers are positioned at the opposite ends of the $x$—$x$ axis and are synchronized in their vibrations and are suitably spaced from each other to promote harmonic particle movement along the $x$—$x$ axis. With the foregoing conditions met, the particles will move with simple harmonic motion along the $x$—$x$ axis creating alternate regions of compression and rarefaction. Thus, in FIGURE 5, curve 8 represents the pressure variations along the axis at one extremity of particle movement, comprising alternate regions of compression and rarefaction indicated by the letters C and R along the top of the figure. At the opposite extremity of particle movement, a different distribution of compression and rarefaction is established as indicated by the dash line curve 9 and by the letters C and R at the bottom of the figure.

It will be noted that the regions of compression and rarefaction occur at regular intervals, the distance between successive regions of compression, or of rarefaction, being one wave length of the standing wave.

A standing wave results from the resonance of the driving transducers and of the wave propagating in the medium, and from the spacing of the driving transducers, or the driving transducer and its reflector, so that wave reinforcement occurs.

Another characteristic of a standing wave is the existence of pressure nodes—stationary points where no compression or rarefactions occur. These points, designated $n$ in FIGURE 5, are midway between the points of alternating maximum compression and rarefaction, indicated by letters C and R, which are known as pressure "antinodes."

Between antinodes of the standing wave, the particles execute harmonic motion. Thus, each particle reaches an extreme position, and passes through a median position in time phase with every other particle. This necessarily implies that periodically all moving particles are stationary simultaneously.

Concentrating now on curve 8, and assuming at the beginning of our discussion that particles have been concentrated at the regions of compression, it will be noted that subsequent particle movement will be directed towards points 10 and 10a where the next successive compression will be formed, as indicated by curve 9. During such particle movement maximum velocities will be attained at the pressure nodes, as indicated by vectors $v_1$ and $v_2$ in the figure.

Assuming now angular rotation $\Omega$ of the entire system and particles having instantaneous velocities $v_1$ and $v_2$, rotation $\Omega$ will generate Coriolis accelerations and produce forces $F_c$ acting on the particles. It will be noted that adjacent vectors are oppositely directed. This results from the difference in sense of the velocities $v_1$ and $v_2$.

Figure 12:
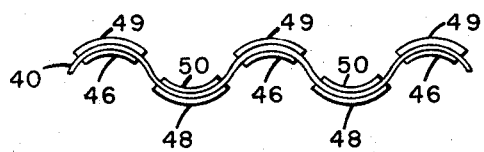
FIGURE 12 is a diagrammatic illustration of the detector transducer when deflected flexurally.

Considering the system as a whole, a Coriolis force vector is associated with every particle. The distribution of forces along the $x$—$x$ axis varies sinusoidally because of the harmonic variation of particle velocity along the axis. A planar crystal positioned parallel to the $x$-$x$ axis is subjected to these sinusoidal forces and is deflected into a flexural wave, as will become more apparent in connection with FIGURE 12.

As mentioned earlier, the Coriolis forces are dependent only upon particle velocity and rate of rotation of the system. In other words, the Coriolis forces normal to the standing wave are uniform throughout the length of the wave for particles having the same velocity, although they have a sense dependent upon the sense of the velocity as illustrated by vectors $F_c$.

The foregoing principles apply with equal vigor to sensors having a driving transducer and a reflector, instead of a pair of driving transducers. Should a phase change be introduced upon reflection of the acoustic wave, wave reinforcement may still be assured by proper spacing between the driving transducer and reflector.

Energy considerations and impedance

To this point in our discussion we have spoken of particle velocity without consideration for the energy that must be imparted to the medium to establish the standing wave.

As has been pointed out, an acoustic wave is a periodic disturbance of alternating compression and rarefaction propagating in a medium at a given velocity. Thus the acoustic wave is a mechanism whereby energy is transferred from one place to another in a medium. Just as characteristics of electromagnetic waves change throughout the frequency spectrum, properties of acoustic waves vary with frequency. The study and application of higher frequency waves, such as employed by the present invention, comprise the field of ultrasonics.

Impedance is a notion useful in summarizing the condition under which energy is transferred. In an effort to set up a simple approximation of energy transfer within a boundaryless medium, we can make the assumption that there is no energy attenuation within the medium itself. Although such an assumption is almost valid for a medium, such as the fluid within a sensor, it does not necessarily follow that one-hundred percent energy transfer to the fluid is possible. The effectiveness of the driving transducer in transferring energy to the medium depends upon its acoustic impedance relative to that of the medium. Similarly, the percentage of energy reflected by the reflecting surface is also a function of the acoustic impedance of the reflecting surface and medium.

The concept of impedance is dependent to a large measure on the configuration of the energy in one medium relative to a second medium to which the energy is to be transferred. To illustrate, the amount of kinetic energy that a body possesses is a measure of the amount of work it is capable of doing by virtue of its mass and movement. A given body usually possesses simultaneously potential energy as well as kinetic energy, the potential energy representing a measure of the amount of work that the body can do by virtue of its mass and position. If the body is to do work, for instance on another body, the energy it possesses has to be transferred to the other body. Its ability to transfer energy to the other body depends upon the form of its energy, that is, for kinetic energy, mass and velocity, and for potential energy, mass and position, in relation to the form that the energy will take in the other body. For example, a body with a certain mass and a certain velocity is able to transfer its kinetic energy completely to another body by simple elastic impact only if the other body has identical mass.

Another factor of equal significance in determining the efficiency of energy transfer is the time relationship between the components of the energy brought about by time variation in the division of total energy between potential energy and kinetic energy.

Summarizing the two concepts, it can be stated that energy can be transferred totally from one system to another only if the configuration of the energy in one system is identical to the configuration in the other system in terms of the ratio of the component parts and the time variation between the component parts. The configuration has been given the name "impedance" and it can be simply stated that complete energy transfer is possible only if impedances are matched. Thus, an impedance match can be visualized as a boundary region between two systems through which energy is wholly transmitted, and an impedance mismatch as a boundary condition through which some energy is transmitted but some is reflected.

Thus, returning to FIGURE 4, it is highly desirable to have an impedance match between the transducer 5 and the medium in which the standing wave is to be established and, it is also important to have, as nearly as possible, a complete impedance mismatch between the reflecting surface at 7 and the impedance of the medium.

With respect to the medium itself, the impedance is a function of its density and compressibility, although it is more convenient to regard impedance as a function of the density and velocity of propagation through the medium, velocity of propagation itself being a function of compressibility and density.

Thus, to the extent that the impedance of the transducer and medium are matched, energy can be forced into the medium, and to the extent that the medium and reflector are mismatched, energy can be prevented from transmitting from the medium into the reflecting member.

*Rectangular sensor*

Shown in FIGURES 6 and 7 is a rectangular sensor in which the foregoing principles have been applied. The sensor comprises a cast iron housing, generally designated 11, having end walls 12 and 13, a bottom 14a, side walls 15a and 16, and a top cover 17. In the end walls 12 and 13 are mounted piezoelectric transducers 14 and 15. Since these transducers, which are driving transducers, are identical, a description of the mounting of one will suffice.

Concentrating attention on transducer 15, it will be noted that it is shaped like a disc and is mounted, as by epoxy resin 18, in a cylindrical support 19. This support has an integral flange 20 which is secured to the end wall 13, all of the parts being carefully assembled so that the planar face 21 of the transducer is parallel to the comparable face of transducer 14, both of the transducers being co-axial. The spacing between transducers is also chosen to promote formation of standing waves as has been explained.

A threaded insulated connector 22 is secured to end wall 23 of the support and makes electrical connection from cable 24 to a resilient beryllium copper contact 25 which rests against the face 26 of the transducer remote from the cavity 27 defined by the housing. The transducer is part of a continuous electrical circuit connected to cable 24, contact 25 making connection to one face of the transducer, the other face being grounded to the housing through connection 15b (see FIGURE 7) which spans the epoxy resin 18.

A detector transducer 28 is cemented by epoxy resin within a plastic frame 29. The frame in turn is clamped by members 30 positioned within recess 31 formed in the bottom wall 14a of the housing. The upper end of the frame is supported by a removable plate 32 which is recessed, as at 33, in the side walls 15a and 16. In this way, the plane of the detector transducer 28 is held mutually parallel to the axis of transducers 14 and 15 and the axis of rotation $y$—$y$ indicated by phantom lines in FIGURES 6 and 7.

The structural details of the detector transducer 28 will be described more fully later in the application. It will be sufficient to note at this time that each face of the transducer has intimately associated with it electrodes, generally designated 34, which are electrically connected to conductors 35 and 36. These conductors in turn are connected to a co-axial cable 37 and a ground connector 38. Auxiliary cover plate 39, secured to cover plate 17, permits access to these various connections.

The cavity of the sensor is filled with liquid, such as glycerine, that may be introduced through the cover plate. As has been explained, the transducers 14 and 15 establish ultrasonic standing acoustic waves in the liquid parallel to detector transducer 28. When the sensor is rotated about $y$—$y$ axis, Coriolis forces are established which flexurally deflect the detector and set up an electrical signal which is transmitted through cable 37 to a suitable detecting circuit to be described.

*Transducers*

Broadly considered, a transducer is a device which changes energy from one form to another. A piezoelectric transducer employs the "piezoelectric effect" and has the ability to convert mechanical energy to electrical energy. The reverse effect, in which a transducer is caused to distort upon applying a potential across it, is called the "converse piezoelectric effect." There are a number of natural crystals which exhibit these effects, such as quartz, Rochelle salts, and tourmaline.

Transducers 14 and 15 and 28 may be made from quartz. More particularly, transducers 14 and 15 are X-cut crystals which, upon application of an electrical potential, distort in thickness and, when excited at their natural resonant frequency, readily establish waves of ultrasonic frequency within the liquid in the sensor. The transducer 28, on the other hand, is an AT-cut crystal which distorts flexurally upon application of an electrical potential to its opposite faces. Conversely, when flexed, this transducer will generate a charge on its opposite faces.

The mounting of the transducers requires special care. A disc type crystal, such as shown at 14 and 15, vibrating in the thickness mode, has a nodal plane which is midway between its two faces. Since it is impractical to mount such a crystal by mechanical contact only in this plane, it is advisable to use a soft substance which contacts only the edges of the crystal to minimize damping by mechanical restraint. This is illustrated, for instance, by the epoxy resin shown at 18, in FIGURES 6 and 7. Similarly, epoxy resin is used around the edges of transducer 28 for mounting it within its frame 29.

Figure 9:
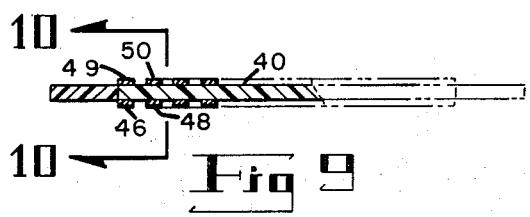
FIGURE 9 is a cross sectional view through the detector transducer taken on plane 9—9 of FIGURE 8.
Figure 10:
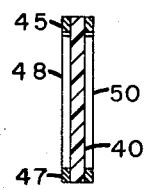
FIGURE 10 is a vertical sectional view of the detector transducer taken on plane 10—10 of FIGURE 9.
Figure 11:
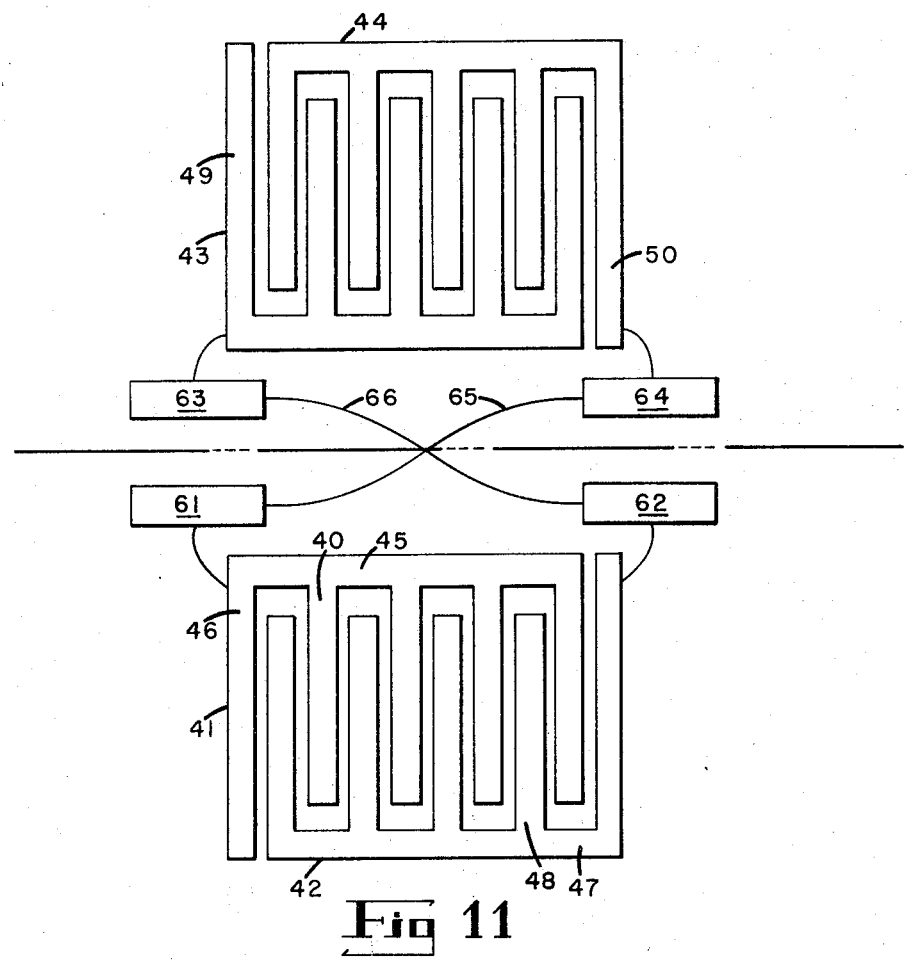
FIGURE 11 is a developed view of the detector transducer shown in FIGURE 8.

Attention should now be directed to FIGURES 8 through 12 which disclose the construction of the detector transducer. As has already been pointed out, the transducer 28 is resiliently mounted in frame 29. As illustrated by FIGURES 9 and 10, the body of the transducer comprises a planar AT-cut crystal 40 to the opposite faces of which are intimately secured, as by electroplating, gold electrodes, generally designated 34. The individual electrodes on each face of the transducer are best illustrated by FIGURE 11 which is a diagrammatic showing of both faces of the detector as developed around a line co-extensive with the top edge of frame 29.

On one face of the transducer, a pair of electrodes 41 and 42 are secured while the opposite face of the transducer a pair of electrodes 43 and 44 are attached, each individual electrode comprising an intricate network of elements. Thus, concentrating attention on electrode 41, it will be noted that it includes a horizontal portion 45 with a number of interconnected strips 46 which extend vertically from member 45. The electrode 42 is somewhat similar, including a horizontal member 47 and a series of interconnected vertical strips 48. The strips 46 and 48 are intercalated and are equally spaced from one another.

The electrodes on one side of the transducer are mirror images of those on the other side and are positioned directly opposite one another as indicated by FIGURE 9. Associated with electrode 43 are strips 49, while strips 50 are associated with electrode 44.

The center to center distance between the adjacent strips of the electrodes is chosen equal to one-half the wave length of the standing wave set up in the sensor by the transducers 14 and 15. This will be more fully understood by reference to FIGURE 12 which has been enlarged and exaggerated in the interest of clarity. Here the transducer 40 is shown distorted, as under the influence of the Coriolis forces. A pair of strips of the opposed electrodes are shown positioned at each crest and each valley of the flexed crystal. Since the polarity of the charge generated on the face of the transducer is a function of the nature of the flexure, i.e., whether it is concave or convex, all of the concave strips of the transducer are electrically interconnected, as are all of the convex strips. This is accomplished by interconnections such as shown in FIGURE 11.

Returning to that figure, it will be noted that four terminals 61–64 are shown, each terminal being connected by an associated conductor to an electrode 41–44, respectively. Since the strips 46 and 50 of electrodes 41 and 44 are all positioned adjacent concave portions of the transducer, they are interconnected by conductor 65. Since the vertical strips 48 and 49 of electrodes 42 and 43 are immediately adjacent the convex portions of the transducer, they are interconnected by conductor 66. Thus, all electrode strips which are subjected to a like polarity by virtue of a common type transducer distortion are electrically interconnected, and each interconnected set of electrodes is connected to one of the conductors 35 or 36. (See FIGURE 6.)

In the interest of simplicity only a few strips have been shown in FIGURE 11. In practice, the number of strips is determined by the length of the detector and the wave length of the acoustic wave in the medium. As indicated by FIGURE 6, a total of about 50 strips are provided on each face of the transducer.

*Cylindrical sensors*

Shown in FIGURES 13–16 are cylindrical sensors which constitute species of the generic invention disclosed herein. The cylindrical sensors are separately described and claimed in application Ser. No. 776,136, filed on Nov. 24, 1958, by William E. Brindley, entitled, Rotation Sensor, now Patent No. 3,145,572. These sensors employ cylindrical transducers for driving purposes and a planar transducer of the type described with reference to FIGURES 8 through 12 for detection purposes.

Figure 14:
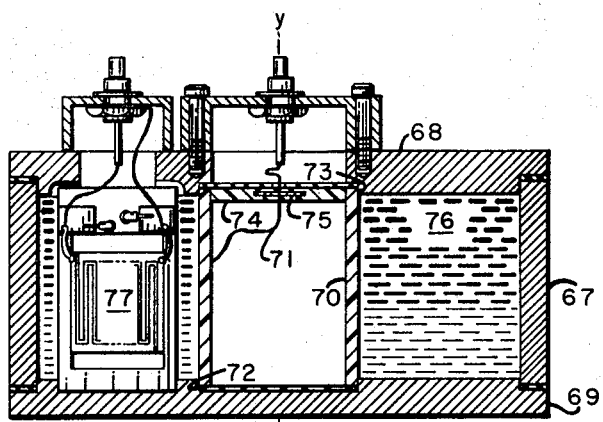
FIGURE 14 is a cross sectional view through the cylindrical sensor of FIGURE 13.

Turning attention first to FIGURE 14, it will be noted that the cylindrical sensor includes a cylindrical outer wall 67 bounded by circular top and bottom walls 68 and 69. Between the top and bottom walls is clamped a cylindrical transducer 70 to the interior of which electrical connection is established through conductor 71, the exterior surface of the transducer being grounded to the top and bottom walls by direct contact at 72 and 73. A plastic end wall 74 may be provided at one end of the transducer to support an anchor member 75 through which the conductor 71 passes.

Figure 13:
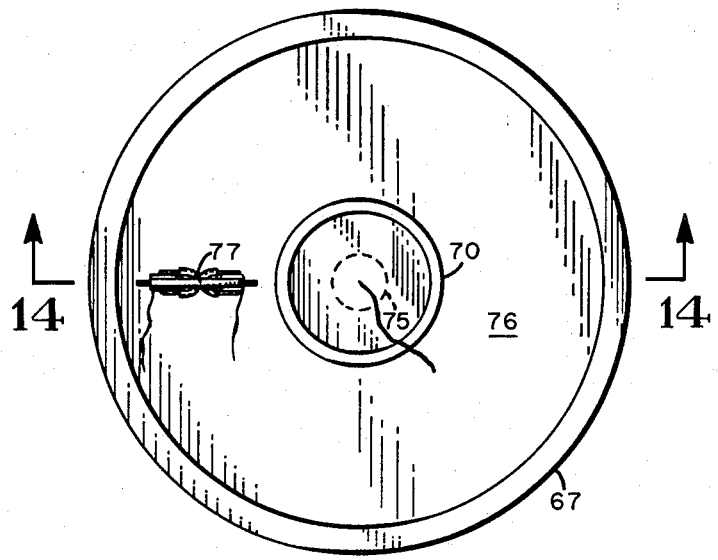
FIGURE 13 is a top plan view of a cylindrical sensor having a single driving transducer, the view showing the sensor as it appears with its top cover plate removed.

In the sensor shown in FIGURES 13 and 14, the transducer 70 acts as a driving transducer and sets up a uniform radially extending standing acoustic wave within the cavity 76 of the sensor, the cavity again being filled with a liquid such as glycerine. A detector transducer 77 is mounted radially within the cavity for detecting Coriolis forces oriented at 90° to the radial standing waves when the sensor is rotated about axis y—y shown in FIGURE 14. The details of the detector transducer, being similar to those already described, will not be discussed in greater detail.

The cylindrical outer wall 67, which may be made from cast iron, serves as a reflector reflecting the waves set up in the medium by the driving transducer 70 and in this way a standing wave is established having an energy per cycle considerably in excess of the energy per cycle delivered by the transducer 70 to the medium.

Figure 15:
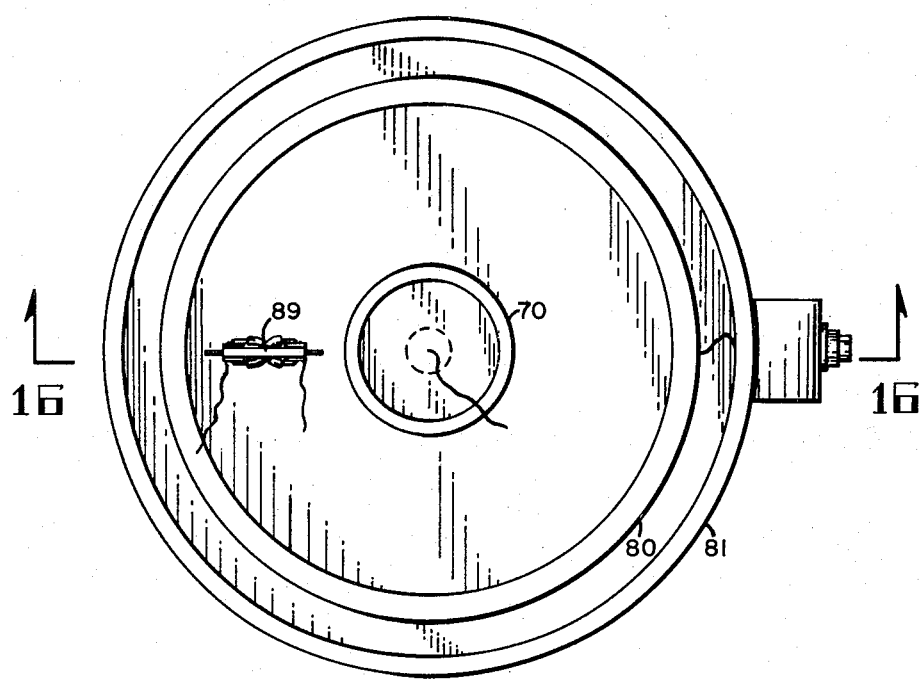
FIGURE 15 is a top plan view of a cylindrical sensor having a pair of driving transducers, the view showing the sensor as it appears with its top cover plate removed.
Figure 16:
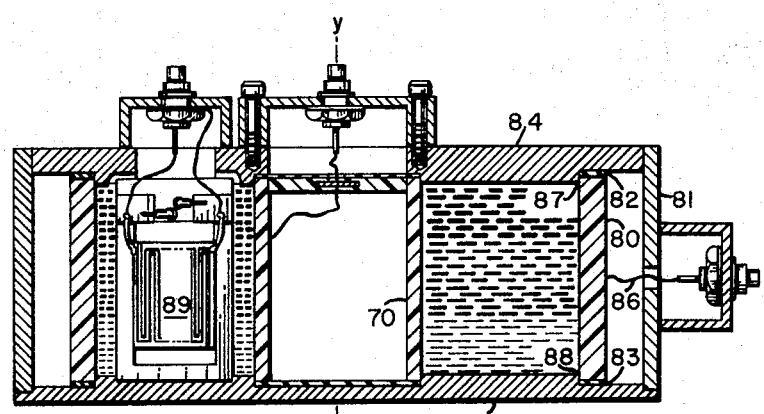
FIGURE 16 is a cross sectional view of the sensor as shown in FIGURE 15.

The same principles may be applied in the construction of a sensor having a pair of driving transducers as shown in FIGURES 15 and 16. In this construction the cylindrical driving transducer 70 is identical with that described with reference to FIGURES 13 and 14 but an additional cylindrical driving transducer 80 is provided adjacent the cylindrical outer wall 81. In the case of the cylindrical transducer 80, it is insulated by gaskets 82 and 83 from the top and bottom walls 84 and 85. Electrical connection is established by conductor 86 which is soldered to the outer surface of the transducer, the inner surface being grounded to the top and bottom walls by direct electrical contact at 87 and 88.

As explained more fully later in the application, the inner and outer driving transducers 70 and 80 may be simultaneously energized from a given electrical source and cooperate in establishing radial standing waves within the cavity of the sensor. Rotation of the sensor about axis y—y generates Coriolis forces with flexurally distort the detector transducer 89 which again is positioned radially within the cavity. The output of the detector provides a measure of rotation.

It will be apparent from a consideration of the foregoing construction that quartz or any other naturally piezoelectric crystal material may be readily used for making planar transducers. However, this is not convenient for making cylindrical transducers, such as required by the cylindrical sensors. For such purposes, it is desirable to use a moldable ceramic material such as barium titanate. Transducers may be made from barium titanate by molding the material into the desired shape and firing it at 1300°–1400° C. After firing, it is polarized by a high electric field, after which suitable electrodes are secured to it, as by electroplating.

*Solid sensors*

To this point in the specification attention has been directed primarily to sensors utilizing fluid as a medium within which the standing wave is established. As illustrated by FIGURES 17 through 20, the same principles may be applied to sensors which employ solids within which the standing waves are established.

Figure 17:
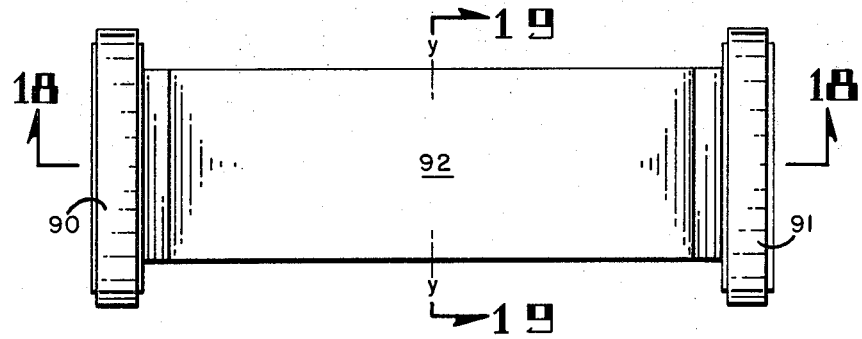
FIGURE 17 is a side elevational view of a sensor having a solid medium within which a pair of transducers establish a standing acoustic wave.
Figure 18:
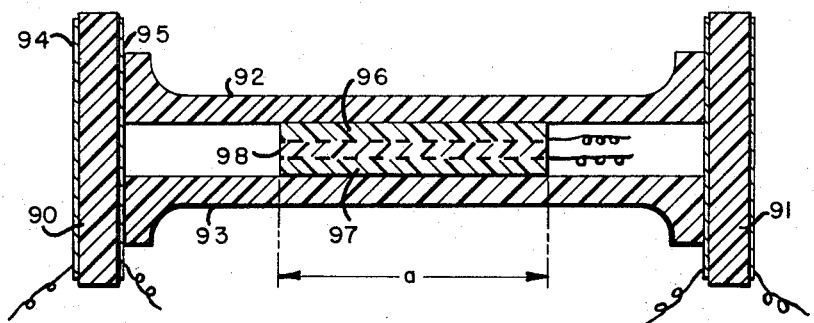
FIGURE 18 is a longitudinal sectional view taken on plane 18—18 of FIGURE 17.
Figure 19:
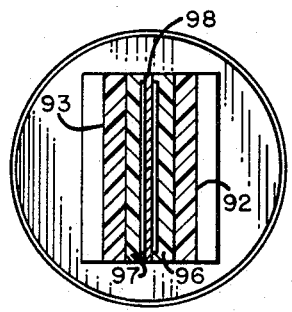
FIGURE 19 is a cross sectional view taken on plane 19—19 of FIGURE 17.

Referring first to FIGURES 17 and 18, a pair of transducers 90 and 91 are shown in intimate association with rigid side members 92 and 93 (made, for example, of fused silica) which extend between the transducers. Each of the transducers also includes a pair of electrodes such as shown at 94 and 95 with reference to transducer 90. When alternating potentials of opposite polarity are impressed upon these electrodes, the transducer is caused to vibrate in a thickness mode imparting a longitudinal compressional acoustic wave to the intervening members 92 and 93. Between these members is positioned a sandwich construction bearing the detector transducer. This sandwich includes fused silica outer layers 96 and 97, between which a transducer 98 is intimately secured. The whole of the center section of the assembly (Region (a) FIGURE 18, including members 96, 97, and 98, and portions of members 92 and 93) is dimensioned so as to be resonant in a length flexural mode at the frequency and with the same wave length as the longitudinal wave in members 92 and 93.

The detector transducer has intimately associated with it a network of electrodes such as particularly described with reference to FIGURE 11; these electrodes pick up the electrical charge from the surface of transducer 98 as it is flexurally distorted by Coriolis forces resulting from rotation of the sensor about axis y–y shown in FIGURE 17.

Figure 20:
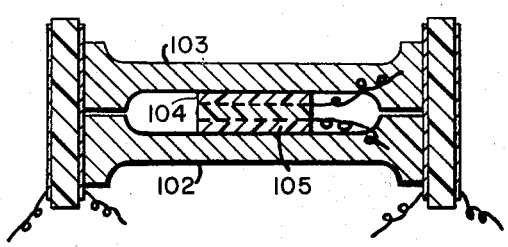
FIGURE 20 is a longitudinal cross sectional view through a modified form of sensor having a solid medium for storage of acoustic energy.

An alternate construction of the solid sensor is shown in FIGURE 20 in which the outer layers 104 and 105 of the sandwich are composed of a material (fused silica, for example) such that the wave length of a shear wave propagating from end to end would be the same as the wave length, at the same frequency, of the longitudinal wave in members 102, 103. (Members 102 and 103 may conveniently be made of a silver-copper alloy.) This arrangement allows greater flexibility in dimensional design of the center section and generally allows a more rugged sensor, especially at higher frequencies.

Associated electronic circuits

In describing the various types of sensors nothing has been said about the energy source for driving the transducers and detecting the degree of flexure of the detector transducer. The circuits themselves are conventional and for this reason will not be described in detail. Basic arrangement of components will be understood, however, by reference to FIGURES 21–23.

Figure 21:
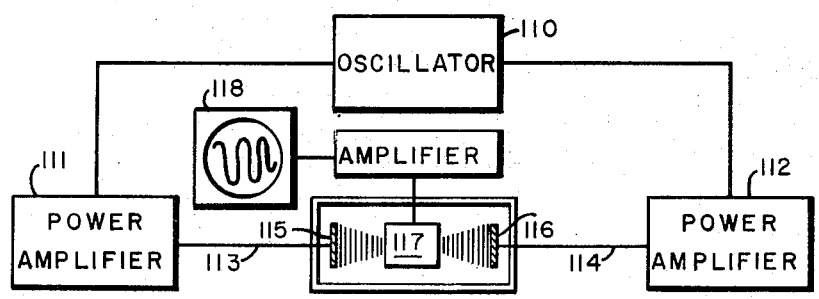
FIGURE 21 is a schematic of electronic circuitry that may be used with a sensor having a pair of driving transducers.

In FIGURE 21 there is disclosed oscillator 110, the output of which is fed in parallel to a pair of amplifiers 111 and 112, which are connected by conductors 113 and 114 to driving transducers 115 and 116. It has been found convenient to drive the transducers at an operating frequency of 800–1000 kc., although this frequency is not critical and may be varied to meet the requirements of particular sensors.

Figure 22:
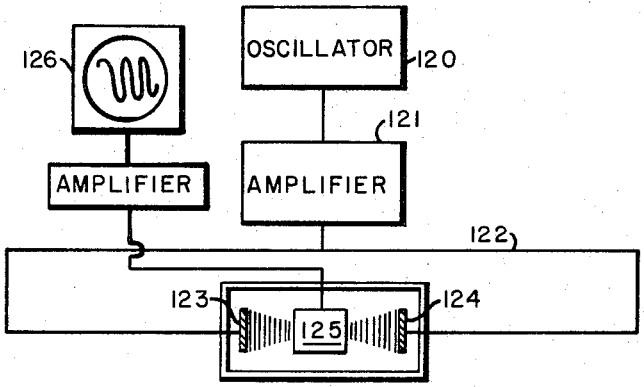
FIGURE 22 shows a modified circuit that may be used in driving a pair of transducers, and, FIGURE 23 shows an arrangement of electronic circuitry that may be used for detecting the phase and strength of an electrical signal generated by a detector transducer.

In the event that it is desirable to use a single amplifier, connections may be made as shown in FIGURE 22. Here a single oscillator 120 is shown connected to a single amplifier 121 which is then connected in parallel by conductor 122 to the opposed transducers 123 and 124.

Figure 23:
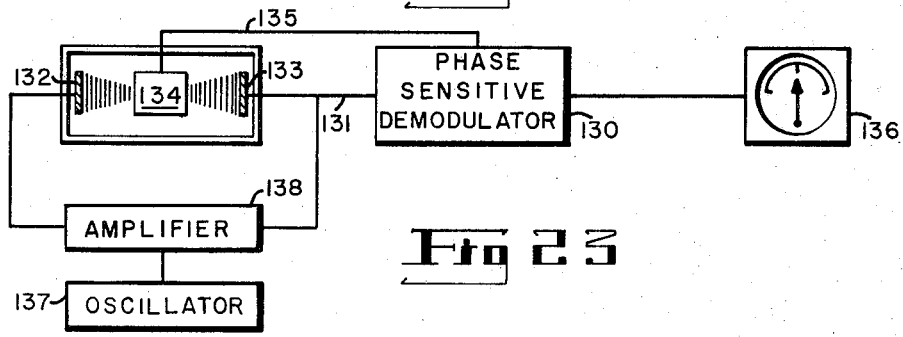

For detecting the output signal from the detector transducer (117 in FIGURE 21; 125 in FIGURE 22), a simple amplifier connected to an oscilloscope (118 in FIGURE 21; 126 in FIGURE 22) may be used. Such an arrangement will detect the magnitude of the signal, which for some purposes, will be satisfactory. On the other hand, where it is necessary to detect, not only the magnitude but the phase relationship relative to the signal from the driving transducers, as necessary in determining the direction of rotation of the sensor, the circuit of FIGURE 23 is preferable.

In this circuit a phase sensitive demodulator 130 is connected by conductor 131 to both of the driving transducers 132 and 133. The output signal from transducer 134 is connected to the phase sensitive demodulator by conductor 135. A D.C. voltmeter 136 connected to the output of the phase sensitive demodulator will indicate a negative D.C. voltage for one direction of rotation and a positive D.C. voltage for the other direction of rotation of the sensor. The amplitude of the voltage shown by the D.C. voltmeter will be proportional to the rate of rotation over a considerable range.

As in the previous circuits, an oscillator 137 and amplifier 138 are provided for driving transducers 132 and 133.

Generally speaking, the output signal from the phase sensitive demodulator may be used in all the ways that a similar signal developed from a conventional gyroscope and its associated electrical circuitry may be used, as for example, as an error signal in a closed loop servo system forming part of a stable platform designed to provide a fixed reference with respect to intertial space despite all manner of movement.

Conclusion

Considered generally, a method of detecting rotation is taught by this invention which is based upon the use of Coriolis forces which are generated when a standing acoustic wave is rotated. The rate of rotation and the direction of rotation may be determined by the magnitude and phase of the Coriolis forces as indicated by a detector which is distorted by the Coriolis forces. Under some conditions, the sensor can also be used in directly detecting angular accelerations through the forces associated therewith which are imposed on the detector.

In its most convenient form the sensors described herein depend for their operation on ultrasonic standing waves in a propagating medium. The medium may be either a fluid or a solid, or combination of the two such as a powder dispersed in the fluid, and the standing wave may be created by either a plurality of driving transducers or a single transducer in association with a reflector.

It is noteworthy that the present invention does not employ any moving parts in the conventional sense. For this reason, no friction is present and therefore its rate of deterioration is much lower. No processional problems are created by mechanical bearings as in conventional gyroscopic mechanisms. For this reason, the sensors are particularly well adapted for guidance systems of long range vehicles where precessional errors can introduce signal errors in guidance over an extended period. A further advantage over conventional gyroscopes is the rapidity with which it can be brought from an idle condition to a properly functioning steady state operating condition. This rapid starting is particularly useful for missile application where instant readiness is obviously desirable.

Having described my invention, I claim:

1. In a rotation sensor, a medium capable of sustaining an acoustic wave wherein the radius of gyration of said medium is not substantially changed by said wave, piezoelectric means for establishing a standing acoustic wave within said medium, and second piezoelectric means actuated by Coriolis forces within said medium acting normal to the direction of local movements of the medium due to the standing wave upon rotation of said medium said rotation having a component at right angles to the direction of said local movements.

2. In a rotation sensor, a medium, means for establishing a standing acoustic wave in said medium without substantially changing the radius of gyration of said medium, and a detector in communication with said medium for detecting Coriolis forces produced by the interaction between inertial rotation and local movements of the medium due to the standing wave as a result of rotation of said medium having a component at right angles to the direction of said local movements.

3. In a sensor, a medium, means for establishing a wave of acoustic energy in said medium without substantially changing the radius of gyration of said medium, and means positioned at an angle to the direction of local movements in said medium due to the acoustic wave for detecting energy components produced by the interaction between positional changes and said local movements as a result of positional changes of said medium having a component at right angles to the direction of said local movements.

4. In a rotation sensor, a medium, means for establishing a standing acoustic wave in said medium without substantially changing the radius of gyration of said medium, and detector means positioned to an angle to the direction of local movements in said medium due to the acoustic wave for detecting Coriolis forces within said medium resulting from interaction between rotation and said local movements, said rotation having a component at right angles to said local movements.

5. In a rotation sensor, a medium, a pair of piezoelectric transducers associated with said medium for establishing a standing acoustic wave therein, piezoelectric detector transducer in communication with said medium, said detector transducer being parallel to the standing wave for detecting forces resulting from interaction between rotation and local movements of the medium due to the standing wave, said rotation having a component at right angles to said local movements, and electronic circuit means for driving said first named transducers and detecting the output of said detector transducer.

6. In a sensor having an axis of rotation, a medium, compressional type piezoelectric means in intimate association with said medium, said means establishing a plane compressional standing acoustic wave in said medium, a second piezoelectric means designed for flexural deflection, said last-named means being in communication with said medium with its flexural axis parallel to the standing wave, the direction of local movements within the medium due to the wave being oriented at an angle to the axis of rotation of the sensor.

7. In a rotation sensor, a housing, a liquid medium within said housing piezoelectric means for establishing an acoustic wave within said medium, and a detector associated with said medium in position to detect Coriolis forces derived from the acoustic wave upon rotation of said housing said rotation having a component at right angles to the direction of local movements within the medium due to the standing wave.

8. Apparatus as defined in claim 7 in which said detector comprises a piezoelectric transducer designed for flexural deflection in response to the Coriolis forces.

9. A rotation sensor comprising a housing defining a rectangular cavity, a liquid medium filling the cavity, compressional type piezoelectric means for establishing a standing acoustic wave through said medium normal to its axis of rotation, a piezoelectric detector transducer of the flexural deflection type immersed in said liquid medium with its flexural axis parallel to the standing wave whereby rotation of said housing may be detected by flexure of said detector transducer under the influence of Coriolis forces derived from the standing wave.

10. Apparatus as defined in claim 9 in which said compressional type piezoelectric means comprises a pair of piezoelectric transducers positioned on opposite sides of said housing.

11. Apparatus as defined in claim 9 in which said compressional type piezoelectric means comprises a piezoelectric transducer and a reflecting surface opposite said piezoelectric transducer.

12. A rotation detector comprising a pair of parallel elongated members, piezoelectric means adjacent the ends of said members for establishing plane compressional acoustic standing waves therein, and a detector transducer associated with said members between the ends thereof for detecting flexural deflections resulting from Coriolis forces associated with the acoustic waves upon rotation of said elongated members.

13. A rotation sensor comprising an elongated member of solid material, a piezoelectric transducer, a layer of a second material positioned intermediate and in abutting relationship with said piezoelectric transducer and said elongated member intermediate its ends, the longitudinal wave length of compressional waves within the material of said elongated member being equal to the shear wave length of shear waves in said intermediate material, and means for establishing compressional acoustic waves within said elongated member, rotation of said elongated member about an axis at an angle to its length generating Coriolis forces for flexurally deflecting said transducer whereby a measure of the rotation is provided.

14. The method of detecting rotational changes of a medium, which comprises establishing an acoustic wave longitudinally throughout the medium without substantially changing the radius of gyration of said medium and detecting force components of the acoustic wave produced by the interaction between inertial rotation and local movements of the medium resulting from rotational change of the medium.

15. The method of measuring rotation of a medium which comprises establishing a standing acoustic wave within the medium without substantially changing the radius of gyration of said medium and detecting Coriolis forces derived directly from the standing wave upon rotation of the medium, said rotation having a component at right angles to the direction of local movements within the medium due to the standing wave.

16. The method of detecting rotation comprising subjecting a medium to the rotation to be detected, establishing a standing acoustic wave longitudinally throughout the medium at an angle to the axis of rotation whereby the radius of gyration of said medium remains substantially unaffected, measuring the magnitude of Coriolis forces associated with the acoustic wave as a result of its rotation and comparing the phase relationship between the Coriolis forces and the standing wave whereby the rate and direction of rotation may be established.

17. The method of measuring rotation of a medium which comprises establishing a standing acoustic wave in a medium and detecting the change of the state of said wave produced by the interaction between inertial rotation and local movements of the medium due to said wave when said medium is displaced in a direction having a component at right angles to the direction of said local movements.

18. The method of measuring rotation of a medium which comprises establishing a standing acoustic wave in a medium and detecting the change of the state of said wave produced by the interaction between inertial rotation and local movements of the medium due to said wave when said medium is displaced in a direction having a component perpendicular to the direction of said local movements.

19. The method of measuring rotation of a medium which comprises establishing a standing, longitudinal oscillation within said medium, and measuring changes in the state of said wave produced by the interaction between inertial rotation and local movements of the medium due to said wave when said medium is displaced in a direction substantially perpendicular to the direction of said local movements.

20. A gyroscopic device comprising a sound conductor containing a fluid sound conducting medium, means for generating a sustained, standing, longitudinal oscillation within said conductor, and means on opposite sides of a nodal point of said oscillation for measuring changes in pressure of said nodal point when said conductor is displaced in a direction perpendicular to said longitudinal oscillation.

21. In a rotation sensor, a medium adapted to support acoustic waves;
driving means for setting up acoustic-wave displacements of elements of the medium having at least a component along a first direction;
means for supporting the medium to permit rotation of the same about an axis extending along a second direction orthogonal to the first direction in order to produce Coriolis forces along a third direction orthogonal to the first and second directions resulting from the velocity displacements of said elements along the first direction and the angular velocity about said axis, thereby to generate in said medium further acoustic-wave displacements having at least a component along the third direction; and
detector means positioned with respect to the medium for detecting the said further acoustic wave displacements.

22. In the method of measuring rotation, the steps comprising:
setting up acoustic waves in a medium along a first direction;
supporting the medium to permit rotation of the same about an axis extending along a second direction orthogonal to the first direction, thereby to generate through the action of Coriolis forces along a third direction orthogonal to the first and second directions, further acoustic-wave displacements having at least a component along the third direction; and detecting the said further acoustic-wave displacements.

References Cited

UNITED STATES PATENTS

| | | | |
|---|---|---|---|
| 2,490,452 | 12/1949 | Mason | 310—8.1 |
| 2,683,247 | 7/1954 | Wiley | 73—505 X |
| 2,683,596 | 7/1954 | Morrow et al. | 324—70 |
| 2,753,469 | 7/1956 | Statham | 73—516 |
| 2,836,737 | 5/1959 | Crownover | 310—8.1 |
| 2,874,568 | 2/1959 | Petermann | 73—194 |
| 2,880,333 | 3/1959 | Dranetz | 310—8.5 |

JAMES J. GILL, *Primary Examiner.*

A. M. HORTON, S. FEINBERG, A. BLUM, S. LEVINE, J. E. WEST, *Examiners.*

W. J. CURRAN, *Assistant Examiner.*